United States Patent [19]
Stanton et al.

[11] Patent Number: 5,166,868
[45] Date of Patent: Nov. 24, 1992

[54] SEALING PAD FOR A RADIO DEVICE

[75] Inventors: Stephen M. Stanton, Lauderhill; Danielle Dzung, Sunrise; Eduardo Marabotto, Miami, all of Fla.

[73] Assignee: Motorola, Inc., Schaumburg, Ill.

[21] Appl. No.: 837,574

[22] Filed: Feb. 18, 1992

Related U.S. Application Data

[63] Continuation of Ser. No. 625,737, Dec. 11, 1990, abandoned.

[51] Int. Cl.$^5$ .............................................. H05K 7/00
[52] U.S. Cl. .................................. 361/422; 361/380; 361/392; 361/394; 455/89
[58] Field of Search ............... 361/380, 392, 393, 394, 361/422; 200/5 A; 455/351, 347, 89, 95, 90, 350

[56] References Cited

U.S. PATENT DOCUMENTS 4,225,970  9/1980  Jaramillo et al. .................... 455/351
4,419,770 12/1983  Yagi et al. ........................... 455/351

Primary Examiner—Leo P. Picard
Assistant Examiner—Young S. Whang
Attorney, Agent, or Firm—Robert S. Babayi

[57] ABSTRACT

A molded sealing pad for a radio housing assembly is provided which has an outer sealing portion for sealing the outer periphery of the radio housing, and an inner sealing portion for sealing inner apertures of the housing assembly. The outer sealing portion includes push button actuation elements which may be actuated by exerting a horizontal actution force, and the inner sealing portion includes key pad buttons which may be actuated by exerting a vertical actuation force.

7 Claims, 1 Drawing Sheet

SEALING PAD FOR A RADIO DEVICE

This is a continuation of application Ser. No. 625,737, filed Dec. 11, 1990, and now abandoned.

TECHNICAL FIELD

This invention relates generally to sealing pads and in particular to molded sealing pads for sealing apertures on a radio device.

BACKGROUND

One of the important aspects of mechanical integrity of a radio device comprises sealing its exterior housing so as to prevent entry of undesired substances, such as water and dust.

The radio device includes a housing which encloses circuit assembly and subassemblies. Exterior surfaces of the housing may include apertures for accessing user interface switches and buttons, such as push buttons and key pad buttons. Additionally, the radio housing may include a grill portion having apertures for transfer of acoustic energy generated by a speaker positioned inside the housing. Conventionally, a number of sealing means such as pads and/or gaskets are utilized for sealing the apertures of the radio housing. Gaskets seal the outer periphery of the radio housing and the individual sealing pads seal the key pad apertures, push button apertures, and grill apertures. However, with the drive for reducing manufacturing cost and increasing manufacturing efficiency, it is desired to provide a single sealing pad which totally seals all of the housing apertures and eliminates the need for utilizing a number of individual sealing means.

SUMMARY OF THE INVENTION

Briefly, according to the invention, a single molded sealing pad for a radio device is provided. The molded sealing pad includes an outer sealing portion for sealing the outer periphery of a radio housing. The outer sealing portion includes first actuation means for actuating a switch positioned within the radio by exerting a substantially horizontal acutation force. Attached to the outer sealing portion is an inner sealing portion which includes second actuation means for actuating key pad switches by exerting a substantially vertical actuation force.

DETAILED DESCRIPTION OF THE PREFERRED EMBODIMENT

Figure 1:
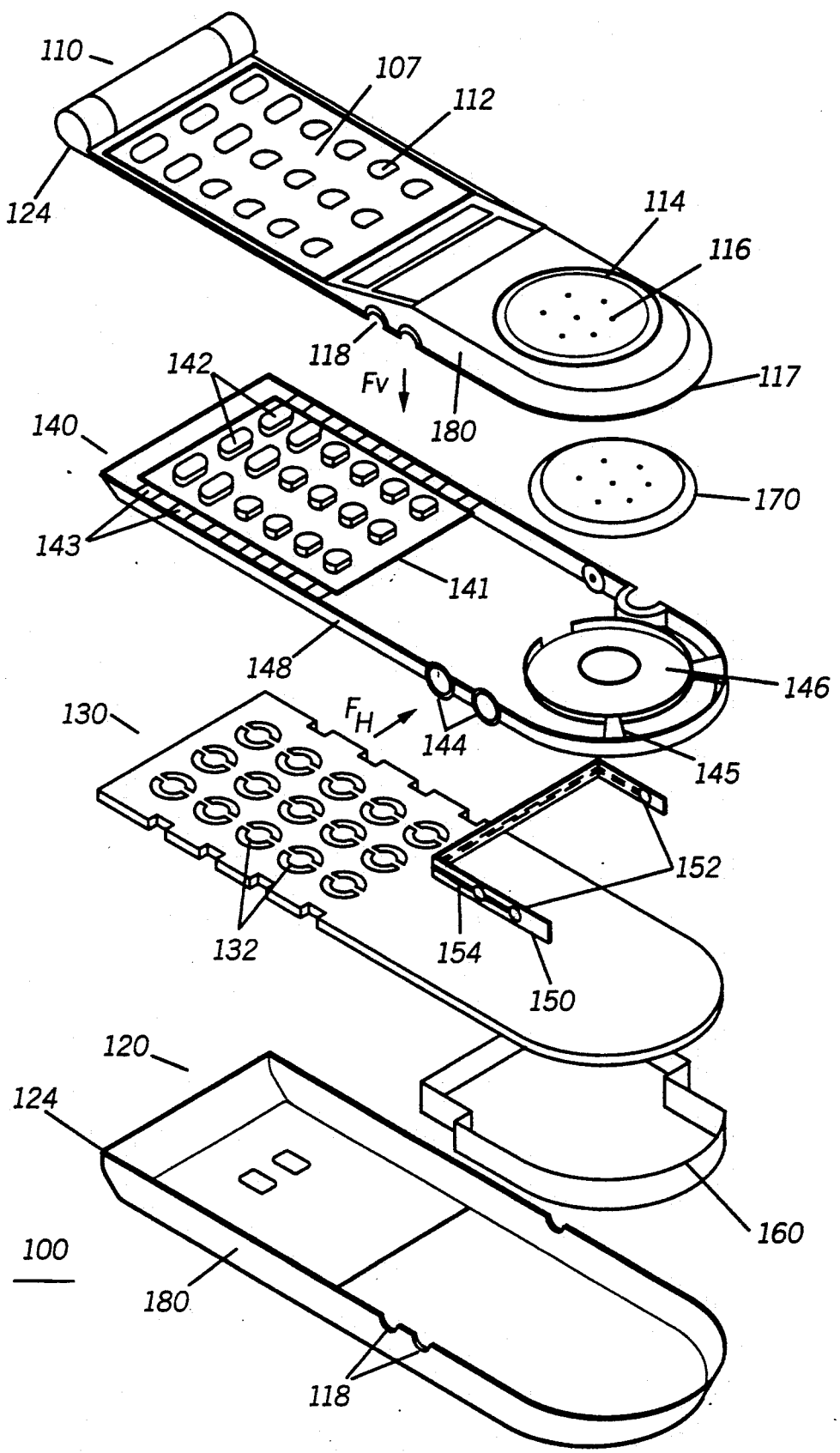
FIG. 1, shows an exploded view of the radio housing assembly which includes the molded sealing pad of the present invention.

Referring to FIG. 1, the exploded view of a radio housing assembly 100 according to the present includes a main circuit board 130 which is positioned between a front housing piece 110 and a rear housing piece 120. The main circuit board 130 includes the electrical circuitry for a two-way radio (not shown) which is capable of accessing a communication system by transmitting proper codes generated via a keyboard. Included on the main circuit board 130 are key pad switches 132 which, upon activation, cause the radio to transmit the proper code to access the communication system. The key pad switches 132 comprise well known printed circuit switches which may be actuated by coupling conductive elements, such as carbon ink, across its contacts. The front housing piece 110 and the rear housing piece 120 may comprise molded plastic or any other suitable molded piece part for providing the desired enclosure for the radio housing 100. The front housing piece 110 includes a speaker grill portion 114 which has formed thereon aperture 116 for transferring acoustic energy created by a speaker 170. The speaker 170 is positioned in an speaker enclosure 117 formed on the opposing surface of the speaker grill 114. The front housing piece 110 has a front side 107 which includes apertures 112 for allowing access to buttons for actuating the switches 132. The front and rear housing means 110 and 120 has peripheral side surfaces 180 which include notches 118. When the radio housing 100 is assembled, the notches 118 form apertures which allow access to buttons for actuating switches from the peripheral sides 180 of the housing assembly 100.

Molded pad 140 of the present invention is positioned between the front housing piece 110 and the rear housing piece 120 and seals outer periphery as well as inner apertures of the housing assembly 100. The molded pad 140 may be made of any suitable sealing material, such as silicon rubber, and may be formed to desired shape by utilizing any well-known injection molding or compression molding processes. The molded pad 140 includes an outer sealing portion 148 which comprises a strip which is properly designed to provide a secure seal around the peripheral rims 124 of the front and rear housing pieces 110 and 120. The molded pad 140 includes a keypad sealing portion 141 which is attached to the outer sealing portions by webs 143. The keypad sealing portion provides for sealing key pad apertures 112 positioned on the front surface 107.

Accordingly, the keypad sealing portion 141 constitutes an inner sealing portion for the molded pad 140. The key pad sealing portion 141 includes a plurality of key pad buttons 142 which may be actuated by exerting actuation forces along a vertical axis. A number of push buttons 144 are formed on the outer sealing portion 148 which may be acutated by exerting actuation forces along a horizontal axis. The molded pad 140 includes a speaker sealing portion 146 which is attached to the outer sealing portion 148 via webs 145 for sealing the speaker 170 in the speaker enclosure 117.

The molded pad 140 is positioned on top of the main circuit board 130 such that the key pad buttons 142 are aligned with corresponding key pad switches 132. Each key pad button 142 has on its opposite side, that is, the side facing the main circuit board 130, a carbon ink element for activating the switches 132 when sufficient vertical actuation force $F_V$ is exerted. The key pad buttons 142 may be accessed from the front surface 107 via key pad apertures 112 positioned on the front housing piece 110. Additional operational features of the radio may be activated by by actuating switches 152 positioned on the peripheral sides of the radio housing assembly 100. In the referred embodiment of the invention, the switches 152 are situated on a flexible circuit 150 and the electrical contacts of the switches 152 are coupled to the main circuit board 130 via conductive runners 154 disposed thereon. The push buttons 144 are aligned with the switches 152 and include carbon ink elements on opposing sides, i.e., the side facing the flexible circuit 150, for activating the switches 152. Therefore, the switches 152 may be acutated by exerting sufficient horizontal acutation force $F_H$ on the push buttons 144. As described herein, the push buttons 144 comprises a first actuation means and the key pad buttons 142 comprise a second actuation means of the molded sealing pad 140. Accordingly, the molded pad 140 has at least one first actuation means and at least one second actuation means which may be actuated by actuation forces having a substantially perpendicular relationship to each other, i.e., the vertical actuation force $F_V$ and horizontal actuation force $F_H$.

The molded pad 140 is positioned between the front housing piece 110 and the rear housing piece 120 such that the outer sealing portion 148 of the sealing pad is securely engaged to the peripheral rims 124 of the housing pieces 110 and 120. The push buttons 144 are inserted into notches 118 formed on the housing pieces 110 and 120. According to this arrangement, the speaker sealing portion 146 is aligned with the speaker grill portion 114 such that the speaker enclosure 117 is covered and the speaker 170 is sealed. A shield frame 160 positioned on the rear housing piece 120 provides the base for the main circuit board 130 and the flexible circuit 150. The front housing piece 110 and the rear housing piece 120 are snapped to each other to complete the assembly.

What is claimed is:

1. A molded pad for a device, the device including a first switch and a second switch, comprising:
    a first portion being an integral part of said molded pad, said first portion including at least one first actuation means for actuating said first switch by exerting a substantially horizontal actuation force, wherein said actuation means is integrally formed on said first portion to be part of said molded pad;
    a second portion being an integral part of said molded pad, said second portion including at least one second actuation means for actuating said second switch by exerting a substantially vertical actuation force, wherein said second actuation means being formed on said second portion to be an integral part of said molded pad.

2. The molded pad of claim 1, wherein said first portion and said second portion comprise an aperture sealing portion for sealing an aperture.

3. A molded sealing pad for a device, the device including a first switch and a second switch and a housing assembly having a front side and peripheral sides, comprising:
    an outer sealing portion for sealing the outer periphery of said housing assembly including at least one first actuation means for actuating said first switch by exerting a substantially horizontal actuation force, wherein said first actuation means is formed on said outer sealing portion to be an integral part of said molded sealing pad;
    an inner sealing portion including at least one second actuation means for actuating said second switch by exerting a substantially vertical actuation force, wherein said second actuation means is formed on said inner sealing portion to be an integral part of said sealing molded pad.

4. The molded sealing pad of claim 3 further including a speaker sealing portion being integrally molded to said outer sealing portion for sealing a speaker enclosure positioned within said housing assembly.

5. A radio housing assembly having a front side and peripheral sides, comprising:
    a front housing piece;
    a rear housing piece;
    a first switch and a second switch;
    a molded sealing pad positioned between the said first housing piece and the rear housing piece including:
    an outer sealing portion being an integral part of said molded sealing pad for sealing the outer periphery of said radio housing assembly, said outer sealing portion including at least one actuation means for actuating said first switch by exerting a substantially horizontal actuation force, wherein said first actuation means is formed on said outer sealing portion to be an integral part of said molded sealing pad;
    an aperture sealing portion being an integral part of said molded sealing pad for sealing apertures of said radio housing; said aperture sealing portion including at least one second actuation means for actuating said second switch by exerting a substantially vertical actuation force, wherein said second actuation means is formed on said aperture sealing portion to be an integral part of said sealing molded pad.

6. The radio housing assembly of claim 5, wherein said molded sealing pad includes a speaker sealing portion being an integral part of said outer sealing portion for sealing a speaker enclosure positioned within said radio housing assembly.

7. The radio housing assembly of claim 5, wherein said inner sealing portion comprises a key pad sealing portion.

* * * * *